Sept. 20, 1960
J. A. JOHNSON
2,953,281
FEEDER FOR FLOWABLE MATERIAL
Filed Aug. 17, 1956
2 Sheets-Sheet 1
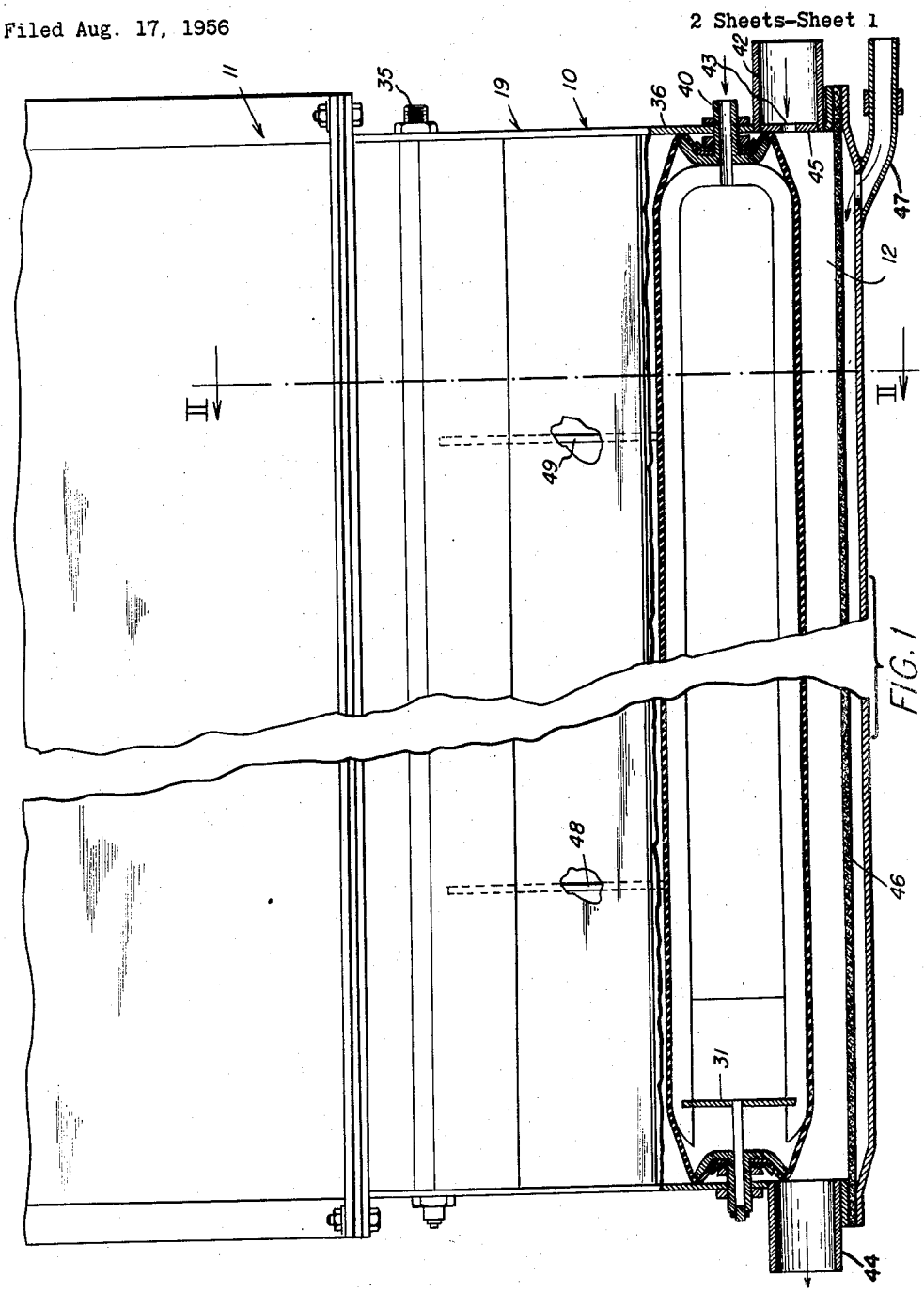
Inventor
John Algot Johnson
By
Attorney Sept. 20 1960  J. A. JOHNSON  2,953,281
FEEDER FOR FLOWABLE MATERIAL
Filed Aug. 17, 1956  2 Sheets-Sheet 2
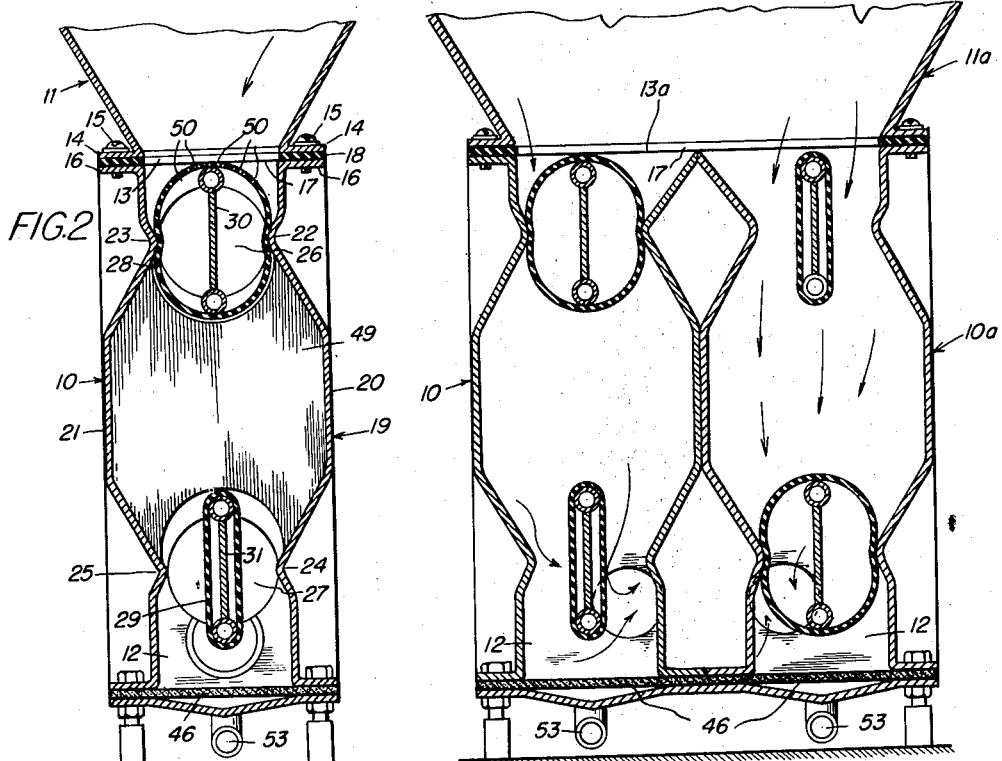
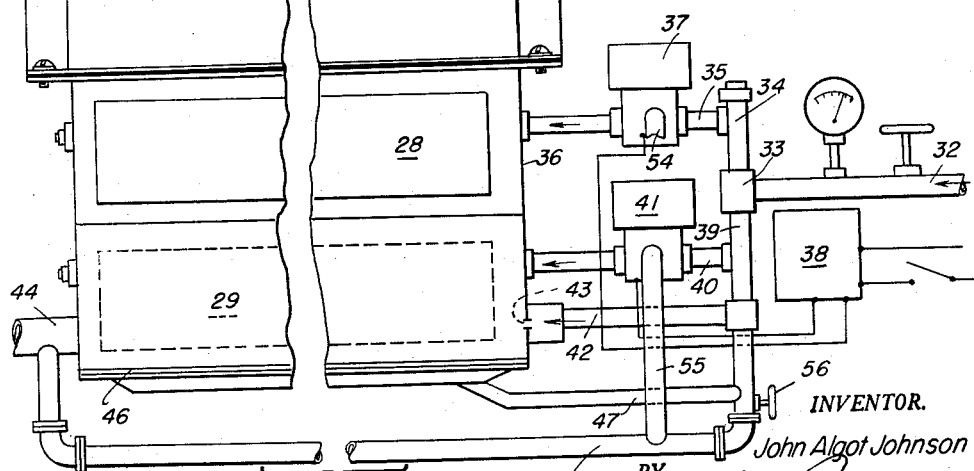
INVENTOR.
John Algot Johnson
Attorney United States Patent Office 2,953,281
Patented Sept. 20, 1960

2,953,281

FEEDER FOR FLOWABLE MATERIAL

John Algot Johnson, 9 Sheridan Drive, Short Hills, N.J.

Filed Aug. 17, 1956, Ser. No. 604,849

12 Claims. (Cl. 222—70)

This invention relates to a feeder for material which flows responsive to the force of gravity, and more particularly a feeder cable of delivering such material at a regulated rate to a point on which a subsequent operation is performed upon it. The invention is especially useful in its application to a feeder for delivering a flowable material, for example, a granular material at a measured rate, to a moving column of air which picks it up and conveys it to a desired location, to which use, however, the invention is not restricted.

Presently known types of apparatus for feeding flowable material depend for their operation largely upon interacting movable mechanical elements which are subject to abrasion, clogging and lubrication difficulties, and the action of which may be completely stopped by the material or portions of it which have been pulverized in the apparatus. Furthermore, operation of such moving mechanical elements requires an appreciable quantity of power. Still further, where rotary feeders are employed, it has been found that certain sizes and types of particles will not go through the feeder or are broken up in the feeder. Moreover, where material is fed through tubular members, resilient parts of which are pinched together or against internal valve seats, the abrasive wear due to axially flowing material is excessive and results in short life of such parts.

The present invention provides a feeder for flowable material the movable elements of which do not interact directly within the feeder. Furthermore, such elements are subject to abrasion to a minimum degree owing to their action upon the material and because the manner of their action upon the material permits them to be made of durable substances. Still further, the organization of the feeder mechanism is such as to prevent clogging of its parts or stoppage of its action by the material passing through it. Moreover, no lubrication whatever of moving parts is required within the feeder; and the control mechanism, being external to the feeder proper, is inaccessible to the material which is fed, and is of such simple lightweight construction that no lubrication problem arises. Finally, operation of a feeder constructed and arranged in accordance with the invention requires a minimum of power for its operation.

According to the invention, the feeder comprises a box having vertical walls between which the flowable material to be fed moves by gravity. In order to regulate the rate of movement of the material through the box, and the rate at which the feeder delivers the material, two valves in the form of closed inflatable members are positioned, one above the other, in the box. Each closed member is out of contact with vertical walls of the box when deflated, but may be inflated to make contact with such walls. Thus, by deflating the upper member and inflating the lower member and then inflating the upper member and deflating the lower member, and repeating such alternating simultaneous inflation and deflation, the movement of material through the feeder may be regulated.

It is presently preferred to construct the feeder with a horizontally elongated box having opposite longitudinal walls turned inwardly toward one another to provide upper and lower longitudinal constrictions in width within the box. In this construction, a separate elastic tube extends for substantially the length of the box in each constriction, and may be inflated to close the constriction. Such construction will presently be particularly described.

The invention is illustrated in its application to a pneumatic conveyor in the accompanying drawings, wherein—

Fig. 1 is a broken longitudinal view of a feeder constructed and arranged according to the invention, and of a hopper which supplies material thereto, parts of the feeder being shown in vertical mid-section;

Fig. 2 is a broken cross-section of the feeder and hopper taken on the line II—II of Fig. 1;

Fig. 3 is a broken longitudinal elevation of the feeder and its material supply hopper illustrated on a reduced scale, and showing semi-diagrammatically the pneumatic connections, valves and timer for regulating the actions of the valves; and Fig. 4 is a cross-section, similar to that illustrated in Fig. 2, through a double feeder supplied with material by a single hopper.

In Figs. 1, 2 and 3 of the drawings, there is shown a feeder 10, to the top of which is bolted a hopper 11, by which flowable material is supplied by gravity flow to the feeder to be delivered thereby at a measured rate to a location of subsequent operation thereon. As here shown, such location is the pick-up chamber 12 of a pneumatic conveyor provided in the bottom of the feeder 10. Thus, flowable material in the hopper 11 passes by gravity into the feeder 10, through which it moves, under control, to the pneumatic pick-up chamber 12 where a moving column of air or other fluid (hereinafter referred to as air) picks up the material and conveys it to a point of storage or use, all as hereinafter described. It is to be particularly observed that no mechanical parts move the material at any stage of its passage through the hopper or the feeder or the pick-up chamber in the bottom of the feeder.

The hopper 11 here shown is a simple trough-like container with an open bottom 13 between outwardly extending flanges 14, through which bolts 15 project to fix the flanges of the hopper to flanges 16 extending outwardly of the open top 17 of the feeder 10. A gasket 18 is shown between the bolted flanges 14 and 16. Thus, flowable material may move downwardly from the hopper, through its open bottom and into the feeder through the open top of the latter.

The feeder 10 here shown comprises a horizontally elongated rigid box 19 having opposite longitudinal walls 20 and 21, here the vertical side walls of the box, turned inwardly toward one another, as at 22 and 23 and at 24 and 25, to provide an upper longitudinal constriction 26 and a lower longitudinal constriction 27 in the width of the box. A closed elastic member in the form of an elastic tube 28 extends for substantially the length of the box in the upper longitudinal constriction 26. A second closed elastic member in the form of an elastic tube 29 extends for substantially the length of the box in the lower longitudinal constriction 27.

Both elastic tubes 28 and 29 are normally collapsed or deflated, that is to say in the condition of the tube 29, shown in Fig. 2. In order to support the tubes when in collapsed condition and in order to cause each tube, when deflated, to make maximum clearance with the inwardly-turned portions 22, 23 and 24, 25 of the opposite walls 20 and 21 of the box, longitudinally extending members 30 and 31 of dumb-bell cross-section are positioned within the tubes 28 and 29 respectively extending the length of the box and fixed to each of its ends. The members 30 and 31 are each symmetrically disposed within the constrictions 26 and 27 respectively with their maximum cross-sectional dimensions at right angles to the narrowest width of the constriction, in order to afford maximum space for passage of material past the collapsed tube.

Accordingly, with both tubes collapsed, material may pass substantially freely by gravity from the hopper 11 into the feeder 10, through the feeder and into the bottom of the box 19. With both tubes collapsed, therefore, the rate of material fed to the bottom of the box is governed by the rate at which material is supplied to the hopper 11, the obstruction offered to material passage by the static feeder, and the rate at which material is removed from the bottom of the box. Thus, by inflating the upper elastic tube 28 until it makes contact with the inwardly-turned walls at 22 and 23, material can be prevented from entering the feeder. By deflating the upper tube, material can be permitted to enter the feeder from the hopper. Similarly, by inflating the lower elastic tube 29, material can be retained in the feeder; and by deflating the lower tube, material can be permitted to flow to the bottom of the feeder for withdrawal in suitable manner, as by an air stream. The rate of feed by the feeder 10 may therefore be governed by the rate of alternate inflation and deflation of the elastic tubes 28 and 29.

From the foregoing it will be evident that each elastic tube and the adjacent inwardly-turned portions of opposite walls of the box constitute a valve. The tubes are inflated to close the valves and deflated to open the valves.

Attention is drawn at this point to the fact that no material passes through the tubes. All flowable material passes the tubes in a direction at right angles to their longitudinal axes, and tangentially to the curves of their outer surfaces. A minimum of wear on the tube material results. This is a marked advantage in comparison to an operation in which material passes through an elastic tube, exercising an abrasive action along its entire length. It is preferred to make the elastic tubes 28 and 29 of rubber, which has proved to be effectively resistant to abrasion.

Attention is additionally drawn to the large clearances provided between the deflated tubes and the walls of the box 19. See Figs. 2 and 4. This construction permits the feeder to be used to handle large particles.

Clearly, the vertical walls of the box might be given a shape different from that described, and the closed elastic members may be formed otherwise than as tubes in order to provide material valves.

Means for alternatively inflating and deflating each closed elastic member, here the elastic tubes 28 and 29, is illustrated in Fig. 3. In the embodiment illustrated, a conduit 32 is supplied with air under pressure by a compressor (not shown) and is connected by a T 33 to a pipe 34 which is connected to a pipe line 35 which is, in turn, connected through an end wall 36 of the feeder box 19 to the interior of the tube 28. A three-way solenoid valve 37 of well-known construction is connected in the pipe line 35, and is operated by a conventional electric timer 38 to apply pressure within and exhaust pressure from the upper elastic tube. In like manner, a pipe 39 is connected to the T 33 and is also connected to a pipe line 40 which is connected through the end wall 36 of the feeder box to interior of the tube 29. Another three-way solenoid valve 41 is connected in the line 40, and is operated by the electric timer 38 to apply pressure within and exhaust pressure from the lower elastic tube. Thus the timer inflates the elastic tubes 28 and 29 in the manner and for the purposes heretofore described. The timer may be adjusted in well-known manner to operate the solenoid valves 37 and 41 at desired rates of speed.

In order to pick up material delivered as described into the pick-up chamber 12 in the bottom of the box 19, an inlet conduit 42, here shown as connected to the pipe 39, delivers air under pressure to an inlet opening 43 at one end of the bottom of the feeder box 19. From the foregoing it will be evident that the elastic tubes 28 and 29 are connected to the same means for supplying air under pressure as is the inlet conduit 42, and that the solenoid valves 37 and 41 control inflation and deflation of the respective elastic tubes.

In order that the air which enters the pick-up chamber in the bottom of the box 19 from the inlet conduit 42 may pick up material and carry it out of the feeder, an outlet conduit 44 is connected to the end of the box 19 opposite to that into which the inlet conduit is connected, also at the bottom of the box. Thus the air delivered by the inlet conduit moves rapidly through the bottom of the box, picking up material delivered thereto by the feeder and carrying such material out of the feeder through the outlet conduit 44 to a point of storage or use.

To assure closing of the valves within the feeder, or firm seating of the inflated elastic tubes 28 and 29 within the constrictions 26 and 27 in the box 19, an orifice plate 45 is fixed in the inlet conduit 42 at the point where it is connected into the box 19. See Fig. 1. The restricted passage through the orifice plate reduces the pressure in the pick-up chamber below that within the elastic tubes, with the described desired result. Means other than an orifice plate might be used to effect the same result.

In the embodiment of the invention here illustrated, a porous diaphragm 46 is positioned across the bottom of the box 19, and a pipe 47 extends from the pipe 39 to a point within the box beneath the diaphragm. As a result of this arrangement, air passing upwardly through the diaphragm prevents packing or adhesion of material in the bottom of the box.

Additional means is provided to insure that the air entering the box 19 from the inlet conduit 42 may pick up all of the material in the feeder below the inflated upper elastic tube 28. Accordingly, baffles are positioned between the longitudinal walls 20 and 21 of the box extending transversely of the axes of the elastic tubes. Two such baffles 48 and 49 are shown in Fig. 1 and the baffle 49 is shown in Fig. 2. These baffles are positioned between the tubes 28 and 29 and are shaped at top and bottom to make contact with the tubes when inflated, or to provide close clearance with the tubes. Thus, with the elastic tube 28 inflated and the elastic tube 29 deflated, air entering the bottom of the box under pressure will not by-pass the material in the feeder but will pick up any material which may be suspended for any reason above the level of the tube 29.

A feeder according to the invention has the advantage of being able to handle non-free-flowing material, such as flour, simply and effectively. It is merely necessary to aerate the material as it enters the feeder. To this end, the upper elastic tube 28 may be perforated, as at 50, to effect such aeration, which is supplemented by air entrapped within the box 19 as the lower tube 29 is inflated and seats against the longitudinal walls 20 and 21 of the box. Furthermore, the porous diaphragm 46 is of great assistance in aerating such material and even in assisting to keep it in suspension.

On the other hand, a feeder according to the invention is also peculiarly adapted to feed material, such as sugar, which is so free-flowing as to be difficult to handle. In this case, the speed of the timer 38 may be reduced to limit the rate of feed of the material. Furthermore, means may be provided for throttling the air to and from the elastic tubes and thus reducing the openings between them and the adjacent wall portions, thus restricting the rate of material movement past them. Such throttling may be effected by adjustment of the solenoid valves 37 and 41 in well-known manner. Furthermore, a by-pass air line may extend around the pick-up chamber 12 from the air pressure supply to the outlet conduit to provide a lower concentration of free-flowing solids in the outlet conduit. Such a by-pass air line 53 is illustrated in Fig. 3 connecting the pipe 39 to the outlet conduit 44.

The by-pass air line may be alternatively or additionally connected to the exhaust port of one of the solenoid valves or to the exhaust ports of both. In the embodiment illustrated in Fig. 3, conduits 54 and 55 are shown connected to the exhaust ports of the solenoid valves 37 and 41 for this purpose, the conduit 54 being shown broken away and the conduit 55 being shown actually connected into the by-pass air line 53. In handling some materials, it has been found advantageous to connect only the solenoid valve 41, which controls the lower tube 29, to the by-pass air line 53. In such case the solenoid valve 37 may exhaust the upper tube 28 to atmosphere and the valve 41 exhausts the lower tube to a pressure above atmosphere. When one or both of the solenoid valves exhaust into the by-pass air line, the air carried thereto by the pipe 39 must be throttled, as by a valve 56.

The invention is capable of embodiment in a variety of forms. For example, two separate feeders 10 and 10a of the type described may be positioned beneath a single hopper 11a and operated alternately by a single electric timer. Such a construction is illustrated in Fig. 4. By operating each feeder by action of its own valves and connections, and by joining the outlet conduit of each feeder to a delivery manifold, a greater capacity may be realized, together with a more uniform and less pulsing flow of delivered material.

It will be especially noted, however, that a feeder according to the invention is not limited to use with a pneumatic conveyor.

The forms of the invention here disclosed and illustrated in the drawings are presented merely as examples of how the invention may be applied. Other forms, embodiments and applications of the invention, coming within the scope of the appended claims, are, of course, contemplated and will readily suggest themselves to those skilled in the art.

I claim:

1. A feeder for flowable material comprising a horizontally elongated rigid box having longitudinal walls turned inwardly to provide an upper and a lower longitudinal constriction in said box; and means for supplying flowable material to the top of said box; in combination with a tube horizontally disposed in the upper constriction inflatable to close said box against entry of material thereto from above transversely to the axis of said tube and against escape of fluid upwardly from said box; a second tube horizontally disposed in the lower constriction inflatable to close said box against passage of material downwardly transversely to the axis of said second tube beyond the lower constriction and upward passage of fluid past the lower constriction; and means for inflating said first-named tube and deflating said second tube and alternately deflating said first-named tube and inflating said second tube to govern passage of flowable material through said box.

2. A feeder for flowable material comprising a box; an inlet conduit connected into one end of bottom thereof; an outlet conduit connected into the opposite end of said box at the bottom thereof; means for supplying a fluid under pressure to said inlet conduit; and means for supplying flowable material to the top of said box; in combination with an elastic tube disposed closely adjacent the top of said box inflatable to close said box against entry of material thereto from above and against escape of fluid upwardly from said box; a second elastic tube disposed in said box beneath said first-named tube and above the connections of said conduits into said box inflatable to close said box against passage of material to the bottom thereof and upward escape of fluid; and means for inflating said first-named tube and deflating said second tube and alternately deflating said first-named tube and inflating said second tube; whereby inflation of said first-named tube and deflation of said second tube alternating with deflation of said first-named tube and inflation of said second tube governs passage of flowable material through said box to the bottom thereof between the connections of said inlet and outlet conduits into said box for pick-up of such material by the fluid from said inlet conduit and movement of the picked-up material away from said box through said outlet conduit.

3. A feeder for flowable material according to claim 2 wherein baffles are positioned between the longitudinal walls of said box transversely of the longitudinal axes of said tubes and are shaped at top and bottom to make slight clearance with the respective tubes when inflated to insure full pick-up of material by the fluid supplied by said inlet conduit.

4. A feeder for flowable material according to claim 2 wherein a porous diaphragm is positioned across the bottom of said box and wherein a connection to the supply of fluid under pressure extends into said box beneath said diaphragm to prevent packing or adhesion of material in the bottom of the feeder.

5. A feeder for flowable material according to claim 2 wherein a by-pass fluid line extends around said box from said inlet conduit to said outlet conduit to provide a lower concentration of free-flowing material in said outlet conduit.

6. A feeder for flowable material according to claim 2 wherein an electric timer governs the inflation and deflation of said elastic tubes.

7. A feeder for flowable material according to claim 6 wherein a by-pass fluid line extends around said box from said inlet conduit to said outlet conduit to provide a lower concentration of free-flowing material in said outlet conduit, and wherein said timer is adjustable to provide slower feed of free-flowing material to the bottom of said box.

8. A feeder for flowable material according to claim 6 wherein said tubes are connected to the same means for supplying fluid under pressure as is said inlet conduit and wherein a valve in each connection is governed by said timer.

9. A feeder for flowable material according to claim 8 wherein said valves are three-way solenoid valves.

10. A feeder for flowable material according to claim 8 wherein a constriction in said inlet conduit reduces the pressure in the bottom of said box below that which inflates said tubes.

11. A feeder for divided material according to claim 8 wherein two like boxes and two sets of elastic tubes are positioned in parallel to receive divided material from said material supply means and to receive fluid under pressure from said fluid supply means, and wherein said timer acts to inflate one upper tube and deflate the other upper tube simultaneously, and at substantially the same time acts to deflate and inflate the respective lower tubes, whereby material is fed alternately to the bottoms of said two like boxes.

12. A feeder for flowable material comprising a box having an inlet opening for a fluid under pressure at one end of the bottom thereof, and an outlet for such fluid at the opposite end of the bottom thereof; an elastic tube disposed closely adjacent the top of said box and inflatable to close said box against entry of material thereto from above and against escape of fluid upwardly from said box, said tube being perforated to aerate non-free-flowing material supplied to said feeder through its top; and a second elastic tube disposed in said box beneath said first-named tube and above the opposite openings at the bottom of said box and inflatable to close said box against passage of material to the bottom thereof and escape of fluid upwardly from the bottom of said box; whereby inflation of said first-named tube and deflation of said other tube alternating with deflation of said first-named tube and inflation of said second tube governs passage of flowable material through said box to the bottom thereof for pick-up and movement out of said box by fluid entering said box through the inlet opening thereof, and whereby an air pressure beneath the feeder greater than that above the feeder is prevented from passing upwardly through the feeder and opposing flow of material therethrough.

References Cited in the file of this patent

UNITED STATES PATENTS

| | | |
|---|---|---|
| 1,325,602 | Albright | Dec. 23, 1919 |
| 2,602,576 | Spruck | July 8, 1952 |
| 2,642,216 | Carter | June 16, 1953 |
| 2,673,011 | Rood et al. | Mar. 23, 1954 |
| 2,772,817 | Jauch | Dec. 4, 1956 |
| 2,783,786 | Carter | Mar. 5, 1957 |
| 2,839,093 | McCarthy | June 17, 1958 |

FOREIGN PATENTS

| | | |
|---|---|---|
| 532,553 | Canada | Nov. 6, 1956 |